US012640169B2

(12) United States Patent
Araki et al.

(10) Patent No.: US 12,640,169 B2
(45) Date of Patent: May 26, 2026

(54) COVER, RECORDING DEVICE, AND METHOD FOR MANUFACTURING COVER

(71) Applicant: NHK SPRING CO., LTD., Yokohama (JP)

(72) Inventors: Toshimitsu Araki, Yokohama (JP); Wataru Miyazaki, Yokohama (JP); Shuji Takahashi, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 134 days.

(21) Appl. No.: 18/833,185

(22) PCT Filed: Feb. 2, 2023

(86) PCT No.: PCT/JP2023/003448
§ 371 (c)(1),
(2) Date: Jul. 25, 2024

(87) PCT Pub. No.: WO2023/149516
PCT Pub. Date: Aug. 10, 2023

(65) Prior Publication Data
US 2025/0111867 A1 Apr. 3, 2025

(30) Foreign Application Priority Data
Feb. 4, 2022 (JP) ................................. 2022-016713

(51) Int. Cl.
| | |
|---|---|
| *G11B 33/14* | (2006.01) |
| *G06F 1/18* | (2026.01) |
| *G06F 1/187* | (2026.01) |
| *G11B 33/02* | (2006.01) |
| *G11B 33/12* | (2006.01) |

(52) U.S. Cl.
CPC .............. *G11B 33/02* (2013.01); *G06F 1/187* (2013.01); *G11B 33/12* (2013.01); *G11B 33/1466* (2013.01)

(58) Field of Classification Search
CPC . G11B 33/14; G11B 33/1446; G11B 33/1453; G11B 33/1466; G06F 1/187; H05K 5/0095; H05K 5/03
See application file for complete search history.

(56) References Cited

U.S. PATENT DOCUMENTS

| | | | | |
|---|---|---|---|---|
| 5,097,978 A | * | 3/1992 | Eckerd | G11B 33/1466 220/315 |
| 5,317,462 A | * | 5/1994 | Kakizaki | G11B 33/1466 |

(Continued)

FOREIGN PATENT DOCUMENTS

JP 2008-123645 A 5/2008

*Primary Examiner* — Adrian S Wilson

(74) *Attorney, Agent, or Firm* — Norris McLaughlin, P.A.

(57) ABSTRACT

A cover is provided with a connection portion on an outer peripheral portion for conducting fastening. The connection portion is provided with a fastening face that is fastened by a bolt on a top face and a connecting face that is connected to the base on a bottom face, and the connection portion is formed into a stepped shape with steps that form a recessed shape on the top face and a projected shape on the bottom face with respect to the outer peripheral portion. The steps are set to have dimensions less than a thickness of a plate material. The stepped shape is provided with an outer face of the step and an inner face of the step that do not overlap each other in a planer direction of the connecting face.

9 Claims, 7 Drawing Sheets

(56) References Cited

U.S. PATENT DOCUMENTS

| | | | | |
|---|---|---|---|---|
| 7,389,992 | B2 * | 6/2008 | Isono | F16J 15/061 |
| | | | | 277/637 |
| 7,408,739 | B2 * | 8/2008 | Kim | G11B 17/038 |
| 7,570,455 | B2 * | 8/2009 | Deguchi | G11B 33/1446 |
| | | | | 365/232 |
| 7,630,168 | B2 * | 12/2009 | Abe | G11B 33/1466 |
| | | | | 360/99.21 |
| 8,238,054 | B2 * | 8/2012 | Kim | G11B 33/1486 |
| | | | | 360/97.12 |
| 9,336,817 | B1 * | 5/2016 | Hirasawa | G11B 25/043 |
| 10,276,215 | B1 * | 4/2019 | Su | G11B 25/043 |
| 10,373,652 | B2 * | 8/2019 | Yap | G11B 23/0326 |
| 10,872,632 | B2 * | 12/2020 | Kato | G11B 25/043 |
| 2003/0179544 | A1 * | 9/2003 | Bruner | G11B 33/08 |
| 2006/0034010 | A1 * | 2/2006 | Abe | G11B 33/1466 |
| | | | | 360/99.21 |
| 2008/0112299 | A1 * | 5/2008 | Shimizu | G11B 33/1466 |
| | | | | 369/75.11 |
| 2010/0232059 | A1 | 9/2010 | Choi | |
| 2010/0296191 | A1 * | 11/2010 | Kim | G11B 33/1453 |
| | | | | 360/97.12 |
| 2013/0222947 | A1 * | 8/2013 | Sugii | G11B 25/043 |
| 2019/0147917 | A1 | 5/2019 | Yap et al. | |
| 2024/0431058 | A1 * | 12/2024 | Yamada | G11B 33/125 |
| 2025/0131945 | A1 * | 4/2025 | Araki | G11B 33/12 |
| 2025/0273247 | A1 * | 8/2025 | Showa | G11B 33/1466 |

* cited by examiner

FIG.2A
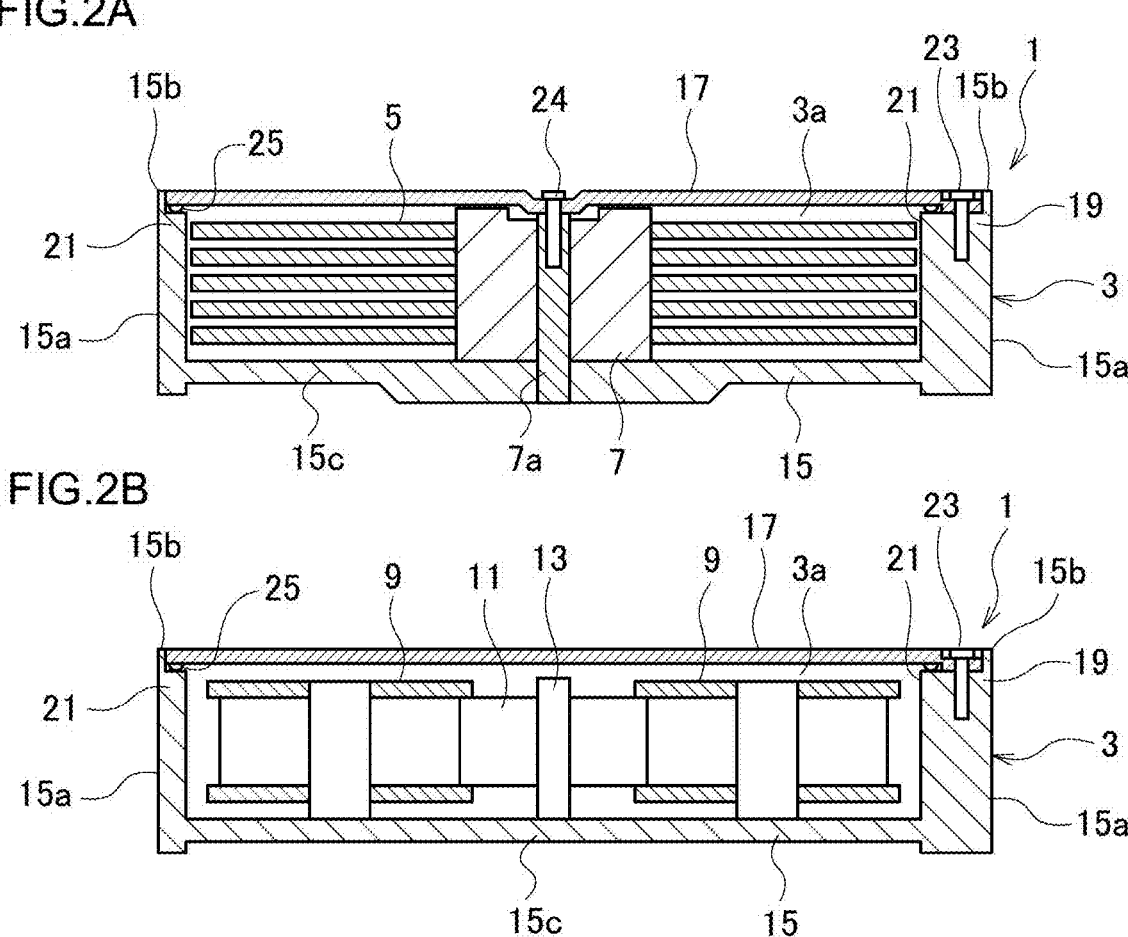
FIG.2B
FIG.3
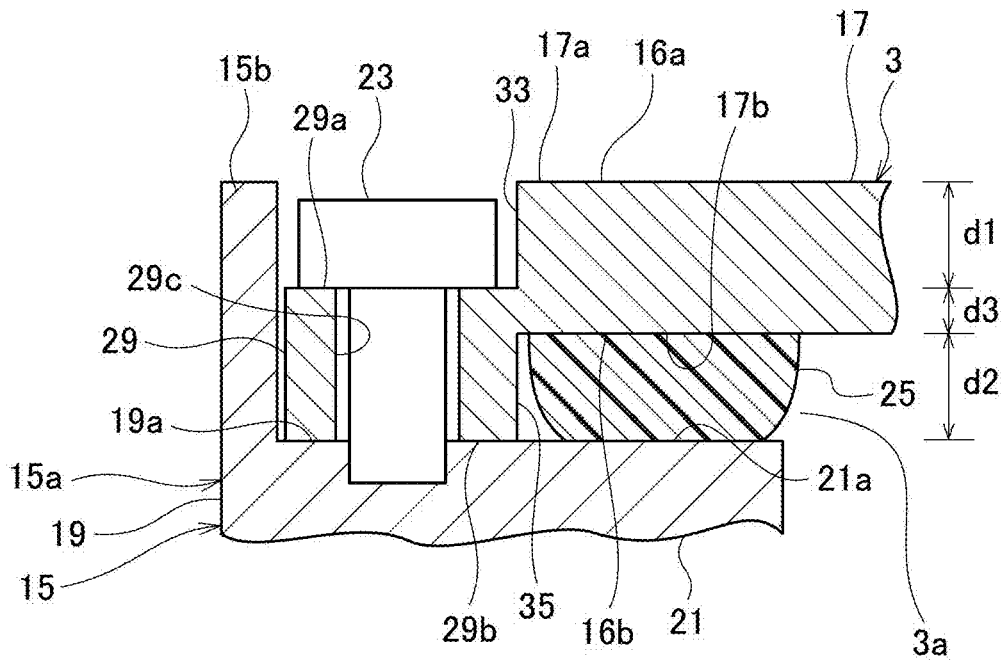

COVER, RECORDING DEVICE, AND METHOD FOR MANUFACTURING COVER

FIELD OF THE INVENTION

The present invention relates to a cover used in a recording device such as a hard disk drive, a recording device using the same, and a method for manufacturing the cover.

BACKGROUND OF THE INVENTION

A hard disk drive as a recording device requires sealability so that dust, moisture and the like are not entered into a space accommodating disks as recording media.

For example, Patent document 1 discloses what connects a cover 101 and a base 103 of a housing 100 defining a space through a gasket 106 for sealing as illustrated in FIG. 14.

In Patent document 1, an outer peripheral portion 101a of the cover 101 is provided with a connection portion 113 with respect to the base 103. The connection portion 113 is provided into a stepped shape on the outer peripheral portion 101a of the cover 101 through a side wall portion 115, and is fastened to the base 103 using a fastener 105 such as a screw.

The gasket 106 is arranged adjacently to the side wall portion 115 of the cover 101. The side wall portion 115 of the cover 101 has an inner face and an outer face along a thickness direction and allows the gasket 106 to be arranged close to the inner face.

The above conventional structure, however, interposes the side wall portion 115 between the gasket 106 and the fastener 105. Then, it impairs flexibility of design in a distance between the gasket 106 and the fastener 105 such that there is a limit on that the gasket 106 and the fastener 105 are close to each other according to need for ensuring the thickness of the side wall portion 115.

PATENT LITERATURE 1: U.S. Pat. No. 10,373,652B

SUMMARY OF THE INVENTION

A problem to be solved is that it impairs flexibility of design in distance between the gasket and the fastener.

The present invention provides a cover using a plate material. The cover is provided with an outer peripheral portion having a top face and a bottom face, to interpose a gasket between the bottom face and a base and be fastened to a base by a fastener from the top face, and a connection portion provided on the outer peripheral portion for conducting the fastening. The connection portion is provided with a fastening face that is fastened by the fastener on the top face and a connecting face that is connected to the base on the bottom face, and the connection portion is formed into a stepped shape with steps that form a recessed shape on the top face and a projected shape on the bottom face relative to the outer peripheral portion. The steps are set to have dimensions less than a thickness of the plate material. The stepped shape is provided with an outer face of the steps and an inner face of the steps, the outer face spanning between the fastening face and the top face of the outer peripheral portion and the inner face spanning between the connecting face and the bottom face of the outer peripheral portion. The outer face and the inner face do not overlap each other in a planer direction of the connecting face.

Further, the present invention provides a recording device accommodating a recording medium in a housing in which the cover is attached to a base. The recording device is provided with a receiving face of the cover provided on the outer peripheral portion of the cover to receive the gasket on the bottom face, a receiving face of the base provided on an outer peripheral portion of the base to receive the gasket, and a connected face of the base provided on the outer peripheral portion of the base to be connected to the connecting face of the cover. The receiving face of the base is flatly adjacent to the connected face of the base.

Furthermore, the present invention provides a method for manufacturing the cover. The method for manufacturing the cover includes a first step of forming a semi-finished cover product being a plate shape having the outer peripheral portion, and a second step of forming the connection portion having the stepped shape on the outer peripheral portion of the semi-finished cover product being the plate shape using half-blanking process of pressing.

The cover of the present invention expands flexibility of setting in distance between the gasket and the fastener, e.g. the gasket and the fastener are closer to each other according to a position of the inner face of the steps.

The recording device of the present invention expands the flexibility of setting in distance between the gasket and the fastener because of use of the cover.

The method for manufacturing the cover of the present invention conducts manufacturing of the cover with ease and accuracy.

BRIEF DESCRIPTION OF THE DRAWINGS

FIG. 2A is a schematic sectional view of the recording device corresponding to a line II-II of the cover of FIG. 1, and FIG. 2B is a schematic sectional view of the recording device corresponding to FIG. 2A according to a modified example:

FIG. 3 is a schematic sectional view illustrating part of the recording device corresponding to a line III-III of FIG. 1;

EMBODIMENT FOR CARRYING OUT THE INVENTION

Figure 1:
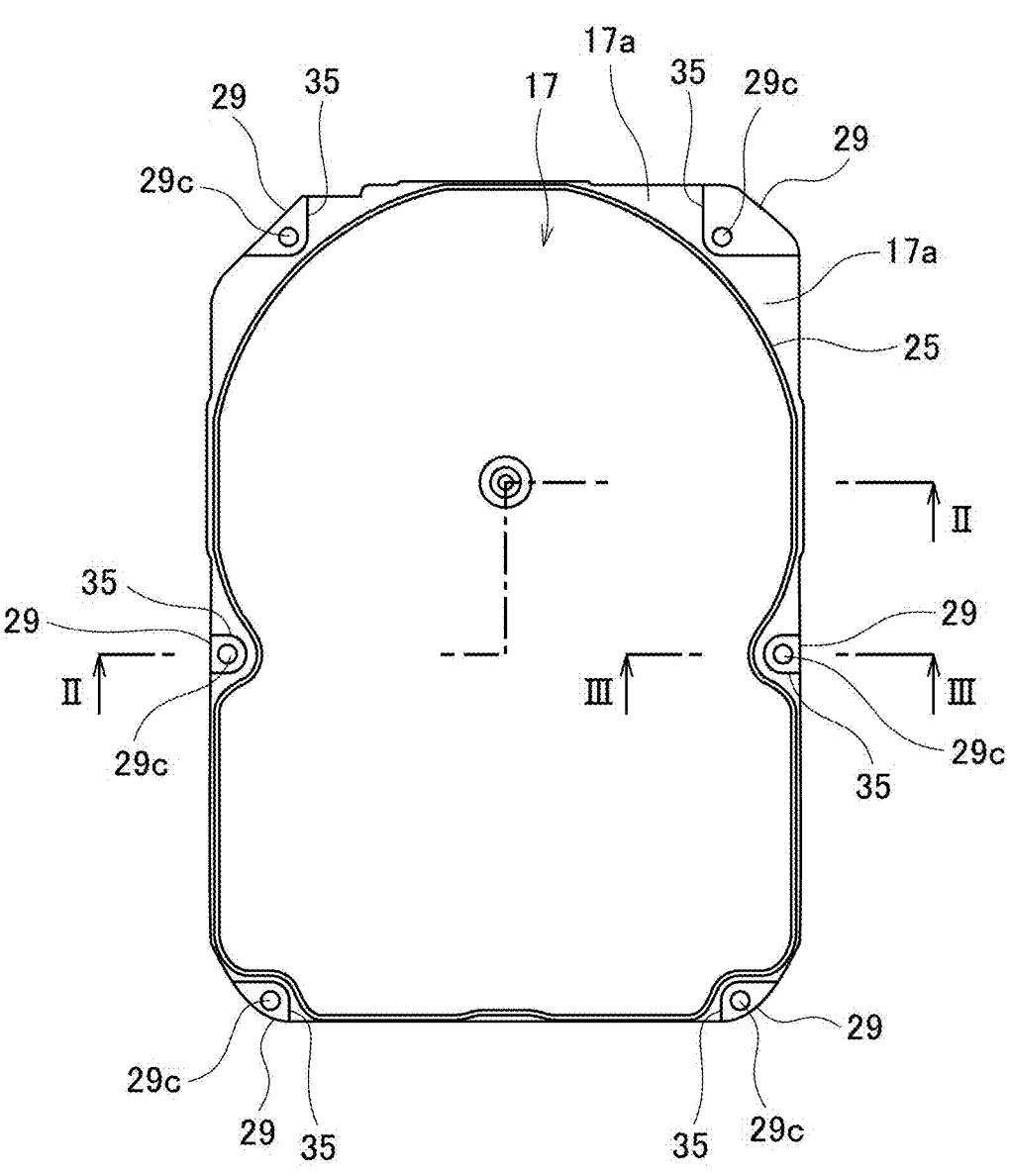
FIG. 1 is a bottom view of a cover used for a recording device according to an embodiment 1 of the present invention.

The object of expanding flexibility of design in setting of distance between a gasket and a fastener is accomplished by putting an inner face and an outer face of steps of a connection portion with a stepped shape not to overlap each other in a planar direction of a connecting face.

As illustrated in FIG. 1-FIG. 13, the cover 17 is a cover using a plate material.

The cover 17 has a top face 16a and a bottom face 16b, and has an outer peripheral portion 17a to interpose a gasket between the bottom face 16b and a base 15 and to be fastened to the base 15 by a fastener 23 from the top face 16a Further, the cover 17 is provided with a connection portion 29 on the outer peripheral portion 17a for conducting the fastening. The connection portion 29 is provided with a fastening face 29a that is fastened by the fastener 23 on the top face 16a of the outer peripheral portion 17a and a connecting face 29b that is connected to the base 15 on the bottom face 16b, and the connection portion is formed into a stepped shape with steps d1 and d2 that form a recessed shape on the top face 16a and a projected shape on the bottom face 16b relative to the outer peripheral portion 17a.

The steps d1 and d2 are set to have dimensions less than a thickness of the plate material. The stepped shape is provided with an outer face 33 and an inner face 35, the outer face of the step d1 spanning between the fastening face 29a and the top face 16a of the outer peripheral portion 17a and the inner face of the step d2 spanning between the connecting face 29b and the bottom face 16b of the outer peripheral portion 17a. The outer face 33 and the inner face 35 are located not to overlap each other in a planer direction of the connecting face 29b.

The outer face 33 and the inner face 35 may be set to intersect the planer direction of the connecting face 29b and may be located with respect to each other within a range less than the thickness of the plate material in the planar direction of the connecting face 29b.

The outer face 33 and the inner face 35 may be located in a same plane or parallel so as to intersect or be orthogonal to the planer direction.

The gasket 25 interposed between the cover and the base 15 may be provided on the cover 17 so as to be adjacent to the connection portion 29.

A recording device 1 using the cover 17 accommodates a recording medium 5 or 11 in a housing 3 in which the cover 17 is attached to the base 15. The recording device 1 is provided with a receiving face 17b of the cover 17, a receiving face 21a of the base 15, and a connected face 19a of the base 15. The receiving face 17b of the cover 17 is provided on the outer peripheral portion 17a of the cover 17 to receive the gasket 25 on the bottom face 16b of the outer peripheral portion 17a. The receiving face 21a of the base 15 is provided on an outer peripheral portion of the base 15 to receive the gasket 25. The connected face 19a of the base 15 is provided on the outer peripheral portion of the base 15 to be connected to the connecting face 29b of the cover 17.

The receiving face 21a of the base 15 may be flatly adjacent to the connected face 19a of the base 15. Alternatively, the receiving face 21a of the base 15 may be adjacent to the connected face 19a of the base 15 in a stepped shape.

In a case that the stepped shape is formed between the receiving face 21a of the base 15 and the connected face 19a, the receiving face 21a of the base 15 may be recessed relative to the connected face 19a of the base 15 to be located farther than the connecting face 29b of the cover 17.

In contrast, the receiving face 21a of the base 15 may be projected from the connected face 19a to be located farther than the connected face 29b of the cover 17.

A method for manufacturing the cover 17 is achieved by an embodiment including a first step of forming a semi-finished cover product having the outer peripheral portion 17a, and a second step of forming the connection portion 29 having the stepped shape on the outer peripheral portion 17a of the semi-finished cover product being the plate shape using half-blanking process of pressing.

Figure 4:
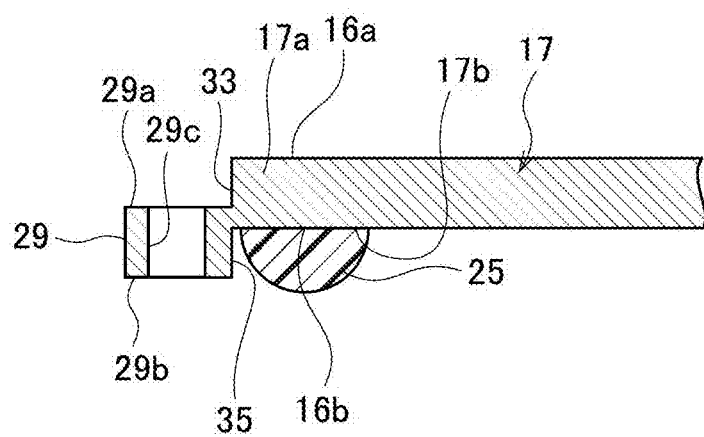
FIG. 4 is a schematic sectional view illustrating part of the cover having a gasket of FIG. 3.

FIG. 1 is a bottom view of a cover used for a recording device according to the embodiment 1 of the present invention. FIG. 2A is a schematic sectional view of the recording device corresponding to a line II-II of the cover of FIG. 1, and FIG. 2B is a schematic sectional view of the recording device corresponding to FIG. 2A according to a modified example. FIG. 3 is a schematic sectional view illustrating part of the recording device corresponding to a line III-III of FIG. 1. FIG. 4 is a schematic sectional view illustrating part of the cover having a gasket of FIG. 3.

A recording device 1 is a hard disk drive as a magnetic disk device and accommodates an internal mechanism that are not illustrated and includes a plurality of disks 5 as recording media in a space 3a inside a housing 3 as illustrated in FIG. 1 and FIG. 2A.

The plurality of the disks 5 are stacked and rotatably supported with a spindle shaft 7a of a spindle motor 7. These disks 5 are configured so that read/write of information is performed through heads that are not illustrated.

It should be noted that the recording device 1 is not limited to the magnetic disk device and may be the other disk drive such as an optical disk device or the other recording device other than the disk device. For example, the recording device 1 may be a tape-embedded-type drive as illustrated in FIG. 2B. This recording device 1 accommodates a tape film 11 wound between two tape reels 9 as a recording medium, a head assembly 13 for read/write of information and the like in a housing 3.

The housing 3 of the recording device 1 includes the base 15 and the cover 17 to close or seal inside as illustrated in FIG. 2A and FIG. 3.

The base 15 is configured into a box shape that is open on one side in a thickness direction of the recording device 1. In addition, the base 15 should be capable of accommodating the disks 5 and may employ an appropriate shape to the extent. The base 15 of the present embodiment has a box shape with an approximate rectangular shape in a plan view, for example.

The plan view means a state seen in the thickness direction and does not mean to distinguish a plan and a bottom. Further, the thickness direction simply stated means the thickness of the recording device 1. The material of the base 15 is metal such as aluminum, but is not limited thereto.

The base 15 is closed by the cover 17 attached to the opening in the thickness direction. With this, the space 3a in the housing 3 accommodating the disks 5 is sealed. Gas such as helium having resistance less than of air may be sealed in the sealed space 3a.

An outer peripheral portion of the base 15 is circumferentially provided with a side wall portion 15a. The opening of the base 15 is defined by the side wall portion 15a. It should be noted that the outer peripheral portion of the base 15 is an outer peripheral region surrounding the internal mechanism including the disks 5, and is a portion on which the side wall portion 15a is provided in the present embodiment.

The side wall portion 15a is integrally raised from a bottom portion 15c having a plate shape of the base 15. The side wall portion 15a may be, however, formed to be separated from and joined to the bottom portion 15c of the base 15 to be configured integrally with the bottom portion.

The side wall portion 15a is provided with cover-receiving portions 19 and a gasket-receiving portion 21.

The cover-receiving portions 19 of the base 15 are located so as to correspond to portions at which the cover 17 is fastened to the base 15. According to the present embodiment, the cover-receiving portions 19 are formed on a plurality of positions, for example, six positions at intervals in a circumferential direction of the base 15. In addition, the cover-receiving portion 19 may be formed into a circumferential shape along the outer peripheral portion of the base 15. The circumferential direction of the base 15 is a perimeter direction along the side wall portion 15a of the base 15.

The cover-receiving portion 19 receives the cover 17 in the thickness direction by connecting the cover. In this connecting state, the cover 17 is fastened to a connected face 19a of the cover-receiving portion 19 of the base 15. According to the present embodiment, a direction of the fastening (hereinafter referred to as fastening direction) matches with the thickness direction.

In addition, the fastening direction may not match with the thickness direction such that it inclines relative to the thickness direction. The connecting direction of the cover 17 to the cover-receiving portion 19 is preferably matched with the fastening direction, but it may not be matched with the fastening direction. Hereinafter, the fastening direction and the contacting direction are indicated as the thickness direction excepting for particularly required.

The fastening is conducted using a fattener, for example, a bolt 23. In addition, the cover 17 is also fastened to the spindle shaft 7a of the spindle motor 7 by a bolt 24. As the fasteners, rivets or the like may be used other than the bolts 23 and 24.

The connected face 19a is formed on an end of the cover-receiving portion 19 in the thickness direction to connect the cover 17. The connected face 19a of the cover-receiving portion 19 is formed flatly by a flat face intersecting the thickness direction. The flat face forming the connected face 19a is orthogonal to the thickness direction in the present embodiment.

The connected face 19a may be, however, slightly inclined to the thickness direction. Further, the connected face 19a may not be the flat face as long as it receives the cover 17 in the thickness direction.

Adjacent to the connected face 19a, an edge wall 15b is raised on the side wall portion 15 of the base 15 in the thickness direction. The edge wall 15b is formed circumferentially along an outer edge of the side wall portion 15a.

The gasket-receiving portion 21 of the base 15 is a portion to receive a gasket 25 attached to the cover 17. The gasket-receiving portion 21 compresses the gasket 25 between the gasket-receiving portion and the cover 17 in the thickness direction as the fastening direction of the bolt 23 by receiving the gasket 25. The gasket-receiving portion 21 of the present embodiment is provided circumferentially along the side wall portion 15a of the base 15 in the plan view.

The gasket-receiving portion 21 has a receiving face 21a to receive the gasket 25. The receiving face 21a is provided continuously circumferentially on the outer peripheral portion of the base 15 and receives the gasket 25 in the thickness direction. The receiving face 21a may be, however, provided partially on the outer peripheral portion of the base 15.

The receiving face 21a of the base 15 of the present embodiment is formed by a flat face similar to the connected face 19a of the base 15 and is flatly adjacent to the connected face 19a of the base 15. With this, the receiving face 21a of the base 15 is continuous to the connected face 19a of the base as the same flat face.

It should be noted that the flat may include a few of an inclination or a step between the connected face 19a of the base 15 and the receiving face 21a of the base 15. In addition, the receiving face 21a may have irregularities or the like as long as it receives the gasket 25.

The cover 17 attached to the base 15 closes the space 3a of the housing 3 accommodating the disks 5. Namely, the connecting face 29b is connected to the connected face 19a of the base 15 and the cover 17 is fastened to the connected face using the bolt 23. With this fastening, the gasket 25 is interposed between the cover 17 and the base 15 to form the housing 3.

The cover 17 is formed of plate material made of metal such as aluminum, and is entirely formed into a flat plate shape to cover the opening of the base 15. The cover 17 of the present embodiment has an approximately rectangular shape in a plan view corresponding to the base 15. A form such as the shape of the cover 17 may not be, however, particularly limited as long as it covers the opening of the base 15. Additionally, the material of the cover 17 may be arbitrary.

An outer peripheral portion 17a of the cover 17 is provided with connection portions 29. The outer peripheral portion 17a of the cover 17 is an outer peripheral region relative to a main body of the cover 17 that covers the internal mechanism installed on the base 15. The outer peripheral portion 17a has a top face 16a and a bottom face 16b. The gasket 25 is interposed between the base 15 and the outer peripheral portion 17a on the bottom face 16b, and the outer peripheral portion is fastened to the base 15 using the bolt 23 from the top face 16a. The top face 16a is a face facing the outside in the thickness direction and the bottom face 16b is a face facing the inside of the housing 3 in the thickness direction.

The connection portions 29 are portions that are connected to the connected face 19a of the base 15 and are fastened using the bolts 23. In the present embodiment, the connection portions 29 are formed at six positions on the outer peripheral portion 17a of the cover 17. The arrangement portions of the connection portions 29 correspond to the cover-receiving portions 19 of the base 15. In addition, the connection portions 29 may be continuously provided in the circumferential direction.

The connection portion 29 is provided with a fastening face 29a and a connecting face 29b. The fastened surface 29a is a face fastened by receiving the fastening of the bolt 23 on the top face 16a of the outer peripheral portion 17a. The connecting face 29b is a face that connects the connected face 19a of the base 15 on the bottom face 16b of the outer peripheral portion 17a. The fastening face 29a and the connecting face 29b are flat faces along a planar direction of the top and the bottom faces 16a and 16b of the outer peripheral portion 17a.

The fastened portion 29a of the connection portion 29 should, however, receive the fastening force caused by the bolt 23 and may be a face slightly inclined relative to the planar direction or be configured by providing a flat face with a recessed portion, a projected portion or the like. Further, the connecting face 29b may have be a face slightly inclined or be configured by providing a flat face with a recessed portion, a projected portion or the like as long as it receives the connected face 19b of the base 15.

In addition, the planer direction is a direction along the connecting face 29b.

The connection portion 29 is set into a stepped shape with steps d1 and d2 that form a recessed shape on the top face 16a and a projected shape on the bottom face 16b relative to the outer peripheral portion 17a. The step d1 is a step of the fastening face 29a relative to the top face 16a of the outer peripheral portion 17a, and the step d2 is a step of the connecting face 29b relative to the bottom face 16b of the outer peripheral portion 17a.

The stepped shape of the connection portion 29 is a shape in which the connecting face 29b and the fastening face 29a of the connection portion 29 are offset from the top and the bottom faces 16a and 16b of the outer peripheral portion 17a of the cover 17 within a range less than the plate thickness of the outer peripheral portion 17a in the thickness direction, respectively. The stepped shape is achieved by half-blanking process using pressing, cutting, forging or the like.

The steps d1 and d2 of the stepped shape are set into dimensions less than the thickness of the plate material forming the cover 17, respectively. According to the present embodiment, the steps d1 and d2 are the same as each other. The steps d1 and d2 may be, however, different from each other.

The steps d1 and d2 of the present embodiment have a dimension being approximate two-fifths of the plate thickness. The dimension of the step d1 may, however, vary according to the thickness of the head of the bolt 23 or the like, and the dimension of the step S2 may vary according to the compression amount of the gasket 25 or the like. For example, the dimension of the step d1 may be altered in a range in which the head of the bolt 23 is not projected.

The stepped shape of the connection portion 29 is provided with an outer face 33 of the step d1 and an inner face 35 of the step d2. The outer face 33 is a face spanning between the fastening face 29a and the top face 16a of the outer peripheral portion 17a, and the inner face 35 is a face spanning between the connecting face 29b and the bottom face 16b of the outer peripheral portion 17a.

The outer face 33 and the inner face 35 are the faces along the thickness direction intersecting the planar direction of the connecting face 29b. According to the present embodiment, the outer face 33 and the inner face 35 are located in the same plane in the thickness direction. With this, the outer face 33 and the inner face 35 are located with respect to each other within a range less than the plate thickness of the plate material forming the cover 17 in the planar direction of the connecting face 29b. It should be noted that one or both of the outer face 33 and the inner face 35 may be inclined with respect to the thickness direction.

The outer face 33 and the inner face 35 are offset in the thickness direction due to the stepped shape of the connection portion 29. Accordingly, the outer face 33 and the inner face 35 are configured not to overlap each other in the planar direction of the connecting face 29b.

Although planar shapes of the connection portions 29 are set differently according to the fastening locations, it is generally shaped to surround a periphery of the bolt 23 as is apparent from the cover 17 of FIG. 1.

An insertion hole 29c for the bolt 23 is formed on each connection portion 29. The bolt 23 passes through the insertion hole 29c and the connection portion 29 is fastened to the connected face 19a of base 15 by bolt 23 in a connecting state.

Adjacent to the connection portion 29, the cover 17 is provided with a receiving face 17b of the cover 17 that faces the receiving face 21a of the base 15.

The receiving face 17b of the cover 17 is to receive the gasket 25 in the thickness direction that is the fastening direction of the bolt 23. In the present embodiment, the receiving face 17b of the cover 17 is provided circumferentially on the outer periphery 17a of the cover 17. The receiving face 17b may be, however, partially provided on the outer periphery 17a of the cover 17.

The receiving face 17b is formed by a flat face similar to the receiving face 21a of the base 15. The receiving face 17b may, however, have irregularities or the like. Further, the receiving face 17b is positioned forward (on the gasket 25 side) in the thickness direction with respect to the fastening face 29a of the connection portion 29, to surely transmit the fastening force of the fastener 23 to the gasket 25.

The gasket 25 is attached to the receiving face 17b of the cover 17. It should be noted that the gasket 25 may be attached to the receiving face 21a of the base 15. Alternatively, the gasket 25 may be interposed between the receiving faces 17b and 21a without attaching.

The gasket 25 is to seal or enclose between the cover 17 and the base 15. The gasket 25 of the present embodiment is a circumferential shape along the outer peripheral portion 17a of the cover 17. It should be noted that the planer shape of the gasket 25 may be arbitrary as long as it seals or enclosures between the cover 17 and the base 15.

The gasket 25 of the present embodiment is projected from the receiving face 17b of the cover 17 in the thickness direction, a tip end section of which is in contact with the receiving surface 21a of the base 15. Then, the gasket 25 is compressed between the receiving face 21a of the base 15 and the receiving face 17b of the cover 17 according to the fastening of the cover 17 to the base 15.

In this state, the gasket 25 has a slight gap with respect to the inner face 35 of the connection portion 29. The gasket 25 may be, however, in close contact with the inner face 35 of the connection portion 29. In a case that the gasket 25 is in close contact with the inner face 35 of the connection portion 29, the inner face 35 functions as a barrier for the gasket 25.

The gasket 25 of the present embodiment is secured along the receiving face 17b of the cover 17. A liquid gasket such as FIPG (Foamed In Place Gasket) is used for the gasket 25. Namely, the gasket 25 is applied and cured in advance on the receiving face 17b of the cover 17 to be secured.

It should be noted that suitable one such as a liquid gasket or a molded gasket may be used for the gasket 25. In the case of the molded gasket, it may be adhered to the cover 17 in advance. Alternatively, a O-ring, a packing, or the like may be used as the gasket 25.

A cross-sectional shape of the gasket 25 is generally a semi-circular cross-section in a free state. As a result, the gasket 25 gradually reduces in width from a middle to a tip end in the thickness direction in the free state, and forms a barrel-shaped cross-section between the cover 17 and the base 15 in a compressed state.

The cover 17 of the present embodiment is manufactured by a manufacturing method including a first step and a second step.

In the first step, a semi-finished cover product being a plate shape having the outer peripheral portion 17a is formed. The first step of the present embodiment performs press-molding and punching of an outer contour. In the press-molding, a cross-sectional shape according to the main body of the cover 17 is formed on the plate material made of metal such as aluminum. The punching of the outer contour performs the punching of the outer contour according to the outer peripheral portion 17*a* of the cover 17.

At this time, the connection portions 29 are not formed on the outer peripheral portion 17*a* and the semi-finished cover product is flat in general. It should be noted that the semi-finished cover product in the first step is not necessarily in the form flat in general as long as it is in a form having the outer peripheral portion 17*a* in which the connection portions 29 are formable. Further, the punching of the semi-finished cover product may leave parts as connections of the semi-finished cover product to the plate material without being conducted to the entire circumference of the cover semi-finished product. Further, in the first step, the punching of the semi-finished cover product may be performed so as to be larger than the corresponding outer contour of the cover 17. In this case, the punched outer contour may be formed into the corresponding outer contour of the cover 17 in another step. Only the punching of the outer contour corresponding to the outer peripheral portion 17*a* of the cover 17 may be performed to form the semi-finished cover product in the first step, and the press-molding of the cross-sectional shape to the semi-finished cover product may be performed in another step.

In the second step, the connection portion 29 having the stepped shape is formed on the outer peripheral portion 17*a* of the semi-finished cover product by half-blanking process using pressing.

This manufacturing method obtains the cover 17 being provided with the stepped connection portions 29 having the fastening face 29*a* and the connecting face 29*b* on the outer peripheral portion 17*a*. It should be noted that, if portions are remained as connections to the plate material in the punching of the semi-finished cover product, the remaining portions may be punched out after the second step.

At the time of the half-blanking process, the stepped outer face 33 and inner face 35 are simultaneously formed as faces along the thickness direction and are offset in the thickness direction to be positioned in the same plane.

At this time, the steps d1 and d2 of the connection portion 29 are simultaneously set due to the formation of the outer face 33 and the inner face 35. The present embodiment, therefore, simultaneously performs the setting of the connection portion 29 to be lowered by the height of the head of the bolt 23 or more and the setting of the compression height of the gasket 25.

A set thickness d3 is maintained between the outer face 33 and the inner surface 35 in the thickness direction as the fastening direction of the bolt 23, between the outer peripheral portion 17*a* of the cover 17 and the connection portion 29. Even the outer face 33 and the inner face 35 are positioned relative to each other within the range less than the plate thickness of the cover 17, in the present embodiment on the same plane, joint strength of the connection portion 29 to the outer peripheral portion 17*a* of the cover 17 is maintained.

Accordingly, the present embodiment does not restrict the setting of the position of the inner face 35 in relation to plate thickness in the planar direction of the connection portion 29*b* and expands flexibility of design.

In particular, in the present embodiment, since the outer face 33 and the inner face 35 are positioned in the same plane, the bolt 23 and the gasket 25 are close to each other in distance. As this result, the fastening force of the bolt 23 is easily transferred to the gasket 25, to contribute accurately sealing.

Further, the bolt 23 and the gasket 25 are closer to each other in distance, thereby expanding the space 3*a* in the housing 3. As this result, the receiving portion 21 for the gasket is ensured within the limited space in the housing 3. It is possible to employ a design to prevent the gasket 25 from being dropped off from the receiving portion 21.

Further, the outer face 33 and the inner face 35 set in the same plane are formed by the half-blanking process, thereby easily positioning the outer face 33 and the inner face 35 in the same plane.

On the formed cover 17, as illustrated in FIG. 4, the gasket 25 is secured by applying and curing the gasket along the receiving face 17*b* of the cover 17. With this, the cover 17 is configured so that the gasket 25 is attached to the receiving face 17*b* and is adjacent to the inner face 35 of the connection portion 29.

The manufacturing of the recording device including the manufacturing method of the cover 17 attaches the cover 17 to which the gasket 25 is attached to the base 15, thereby to enclose the space 3*a* of the housing 3 accommodating the disks 5.

In particular, the internal mechanism including the disks 5 is pre-installed in the base 15. The cover 17 to which the gasket 25 is attached is faced to the opening of the base 15 in the thickness direction. At this time, the tip end section of the gasket 25 is faced to the receiving face 21*a* of the base 15 according to the positioning between the cover 17 and the base 15.

In this state, the cover 17 and the base 15 are brought closer to each other, to bring the tip end section of the gasket 25 into contact with the receiving face 21*a* of the base 15.

Bringing the cover 17 and the base 15 closer the each other, the gasket 25 of the receiving face 17*b* of the cover 17 is compressed between the receiving face 21*a* of the base 15 and the receiving face of the cover.

Then, the connecting face 29*b* of the cover 17 is connected to the connected face 19*a* of the base 15. In this state, the outer peripheral edge of the cover 17 is fitted inside the edge wall 15*b* of the base 15.

With this connected state, the bolt 23 is passed through the insertion hole 29*c* of the connection portion 29 to fasten the cover to the cover-receiving portion 19 of the base 15.

In this way, the cover 17 of the present embodiment is used to obtain the recording device 1 in which the internal mechanism including the disks 5 for read/write of information is installed into the base 15.

According to the present embodiment, since the gasket 25 is attached to the cover 17, the cover 17 is fastened to the base 15, thereby bringing the tip end section of the gasket 25 into contact with the receiving face 21*a* of the base 15. The manufacturing of the recording device 1 is, therefore, easily conducted.

Further, the recording device 1 includes the receiving face 17*b* of the cover 17 and the receiving face 21*a* of the base 15, and the receiving face 21*a* of the base 15 is adjacent to the connected face 19*a* of the base 15 with the flat shape therebetween.

The settings of the steps d1 and d2, therefore, directly determines the compression height of the gasket 25. Accordingly, the cover 17 is simply fastened to the base 15 to compress the gasket 25 to the desired compression height.

Figure 5:
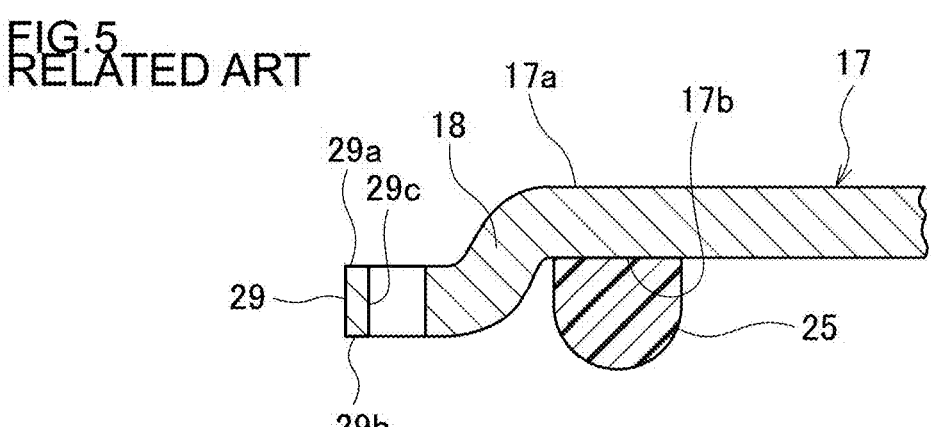
FIG. 5 is a schematic sectional view illustrating part of a cover having a gasket according to a comparative example.

FIG. 5 is a schematic sectional view illustrating part of a cover having a gasket according to a comparative example. In addition, components corresponding to of FIG. 4 are represented with the same reference numerals to be explained in FIG. 5.

FIG. 5 shows a cover 17 in which bending process is conducted by pressing to a plate material made of metal such as aluminum.

As illustrated in FIG. 5, a connection portion 29 is set with steps having dimensions exceeding a plate thickness relative to an outer peripheral portion 17a of the cover 17. Between the connection portion 29 and the outer peripheral portion 17a of the cover 17, a side wall 18 having a dimension of the plate thickness is present.

Accordingly, the gasket 25 and the bolt passing through an insertion hole 29c to be fastened to the base are farther from each other. In the configuration, a space in the housing is limited or the gasket 25 tends to be dropped off according to limitation of a receiving face for the gasket 25 on the base due to the space. Further, fastening force of the bolt to be transmitted to the gasket 25 becomes relatively low and there is a risk to relatively weaken sealing function.

Furthermore, since the connection portion 29 defines the steps with the dimensions exceeding the plate thickness with respect to the outer peripheral portion 17a of the cover 17, it is impossible to excessively thin the dimension in plate thickness of the side wall 18 between the connection portion 29 and the outer peripheral portion 17a of the cover 17.

In contrast, the cover 17 in the present embodiment does not exhibit the issues seen in the comparative example, and there are significant differences in effects by comparison with the comparative example.

Figure 6:
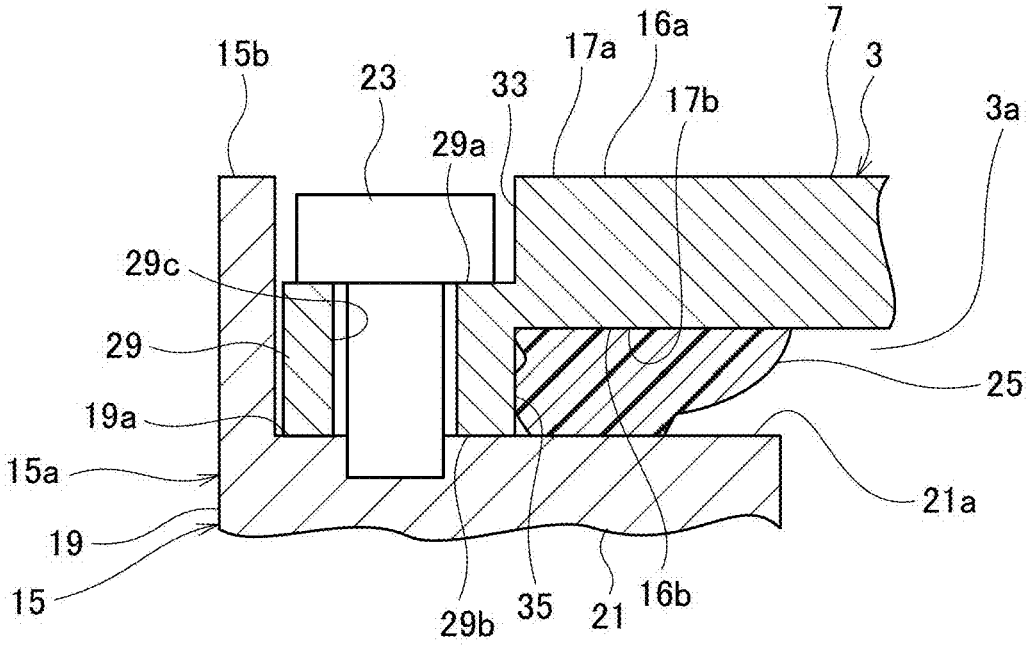
FIG. 6 is a schematic sectional view illustrating part of the recording device corresponding to the line III-III of FIG. 1 according to a modified example of the embodiment 1.
Figure 7:
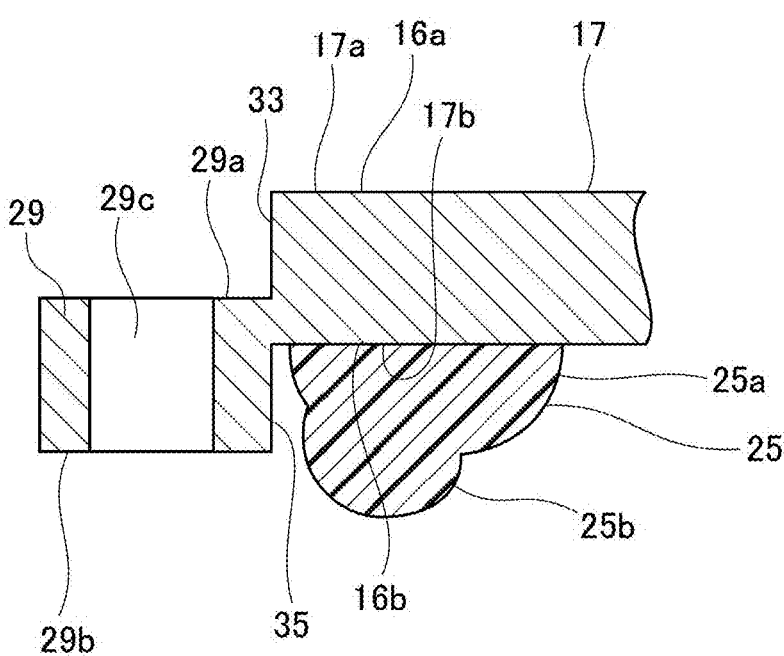
FIG. 7 is a schematic sectional view illustrating part of a cover having the gasket of FIG. 6.

FIG. 6 is a schematic sectional view illustrating part of a recording device corresponding to the line III-III of FIG. 1 according to a modified example of the embodiment 1. FIG. 7 is a schematic sectional view illustrating a part of a cover having a gasket of FIG. 6. In addition, a basic configuration is similar to of the above embodiment and the same or corresponding components are represented with the same reference numerals to eliminate duplicate explanation.

In the present modified example, the configuration of the base 15 and the cover 17 is the same as of the above embodiment and a gasket 25 is formed into a plurality of layers, for example two layers.

The gasket 25 has a base end section 25a and a tip end section 25b having arc-shaped cross-sections with different curvatures, respectively. The base end section 25a is set larger than the tip end section 25b in width. The tip end section 25b is offset toward the inner face 35 of the connection portion 29 relative to the base end section 25a.

It should be noted that the gasket 25 may be similarly set into three or more layers and be additionally set into a plurality of layers in a direction along the connecting face 29b.

In the state that the cover 17 is fastened to the base 15, the tip end section 25b of the gasket 25 receives compression force from the receiving face 21a of the base 15. In the gasket 25 in the compressed state, both the base end section 25a and the tip end section 25b are in close to or in contact with the inner face 35. This prevents the gasket 25 from collapsing. The tip end section 25b is greater than the base end section 25a in lateral displacement due to the compression, to set the distance or the contact state relative to the inner face 35 thereof to be substantially the same as of the base end section 25a.

Even the present modified example provides the same effects as of the embodiment 1.

Figure 8:
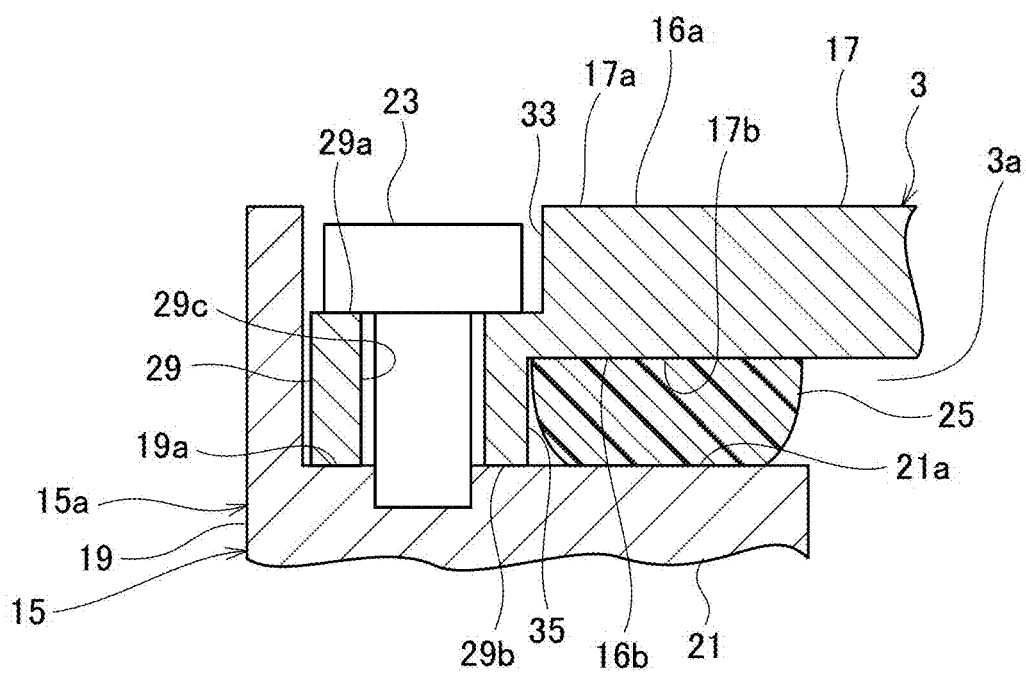
FIG. 8 is a schematic sectional view illustrating part of a recording device corresponding to the line III-III of FIG. 1 according to an embodiment 2 of the present invention.
Figure 9:
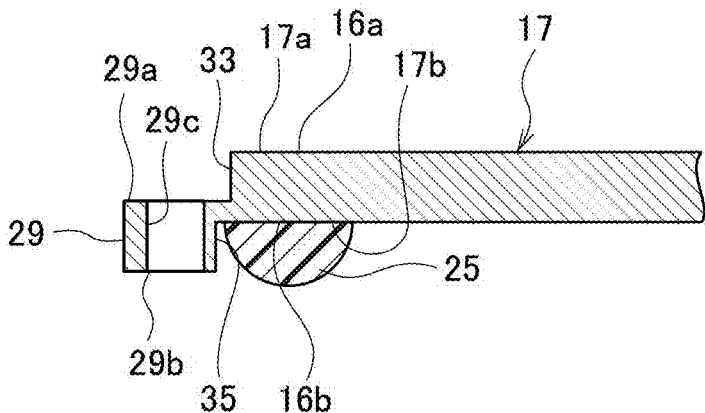
FIG. 9 is a schematic sectional view illustrating part of a cover having a gasket of FIG. 8.

FIG. 8 is a schematic sectional view illustrating part of a recording device corresponding to the line III-III of FIG. 1 according to the embodiment 2 of the present invention. FIG. 9 is a schematic sectional view illustrating part of a cover having a gasket of FIG. 8. In addition, a basic configuration is similar to of the above embodiment and the same or corresponding components are represented with the same reference numerals to eliminate duplicate explanation.

The cover 17 in the present embodiment has an outer face 33 and an inner face 35 of a stepped shape set to be mutually offset in the planar direction of the connecting face 29b. The others are the same as of the embodiment 1.

In particular, the inner face 35 of the stepped shape is arranged on a position offset toward a connection portion 29 relative to the outer face 33 in the direction along the connecting face 29b. A degree of the offset is such that the inner face 35 is positioned in the range less than the thickness of the plate material relative to the outer face 33.

Manufacturing of the cover 17 may be achieved by a combination of half-blanking process of the connection portion 29 using metal plate material such as aluminum and cutting process of the inner face 35 or the like.

Even in this configuration, a set thickness is remained between the outer face 33 and the inner face 35 in the thickness direction as fastening direction of the bolt 23, to maintain joint strength of the connection portion 29 with respect to the outer peripheral portion 17a of the cover 17.

Furthermore, the inner face 35 of the step is entered into the connection portion 29, so that the gasket 25 is brought closer to the bolt 23.

In addition, the present embodiment provides the same effects as the embodiment 1.

Figure 10:
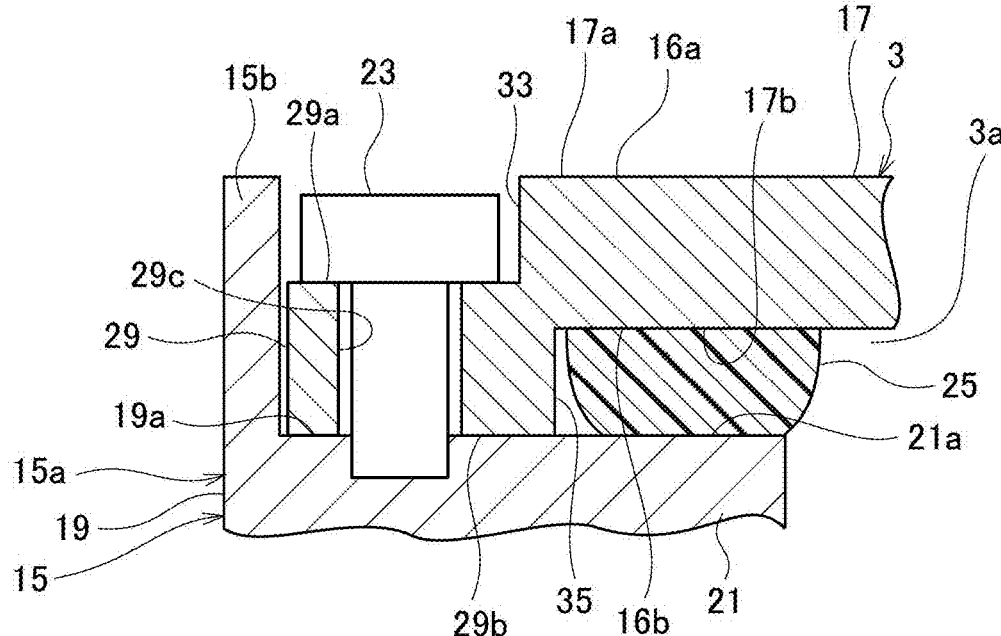
FIG. 10 is a schematic sectional view illustrating part of a recording device corresponding to the line III-III of FIG. 1 according to a modified example of the embodiment 2.
Figure 11:
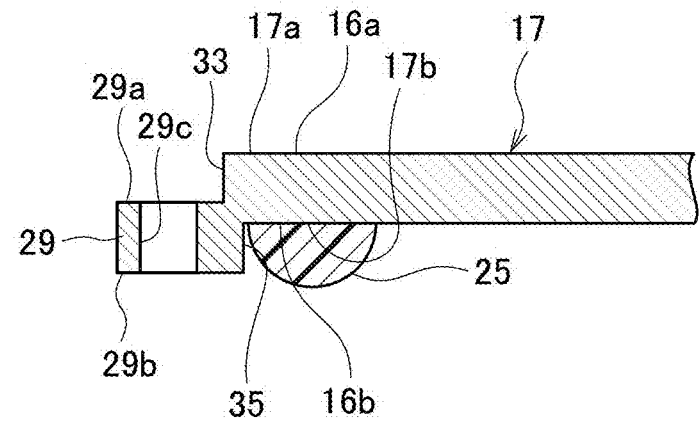
FIG. 11 is a schematic sectional view illustrating part of a cover having a gasket of FIG. 10.

FIG. 10 is a schematic sectional view illustrating part of a recording device corresponding to the line III-III of FIG. 1 according to a modified example of the embodiment 2. FIG. 11 is a schematic sectional view illustrating part of a cover having a gasket of FIG. 10. In addition, a basic configuration is similar to the above embodiment and the same or corresponding components are represented with the same reference numerals to eliminate duplicate explanation.

A cover 17 in the modified example has an inner face 35 of a stepped shape arranged so as to be offset away from a connection portion 29 in a direction along a connecting face 29b relative to an outer face 33. A degree of the offset is such that the inner face 35 of the step is positioned in the range less than the thickness of the plate material relative to the outer face 33.

Manufacturing of the cover 17 may be achieved by a combination of step-bending process of the connection portion 29 using metal plate material such as aluminum and cutting process of the inner face 35 or the like. The step-bending process is achieved by using a special mold or the like.

In this configuration, a thickness set larger than of the embodiments 1 and 2 is remained between the outer face 33 and the inner face 35 in the thickness direction as fastening direction of the bolt 23. Accordingly, the present modified example maintains larger joint strength of the connection portion 29 with respect to the outer peripheral portion 17a of the cover 17 than the embodiments 1 and 2.

In addition, the present modified example provides the same effects as the embodiment 2.

Figure 12:
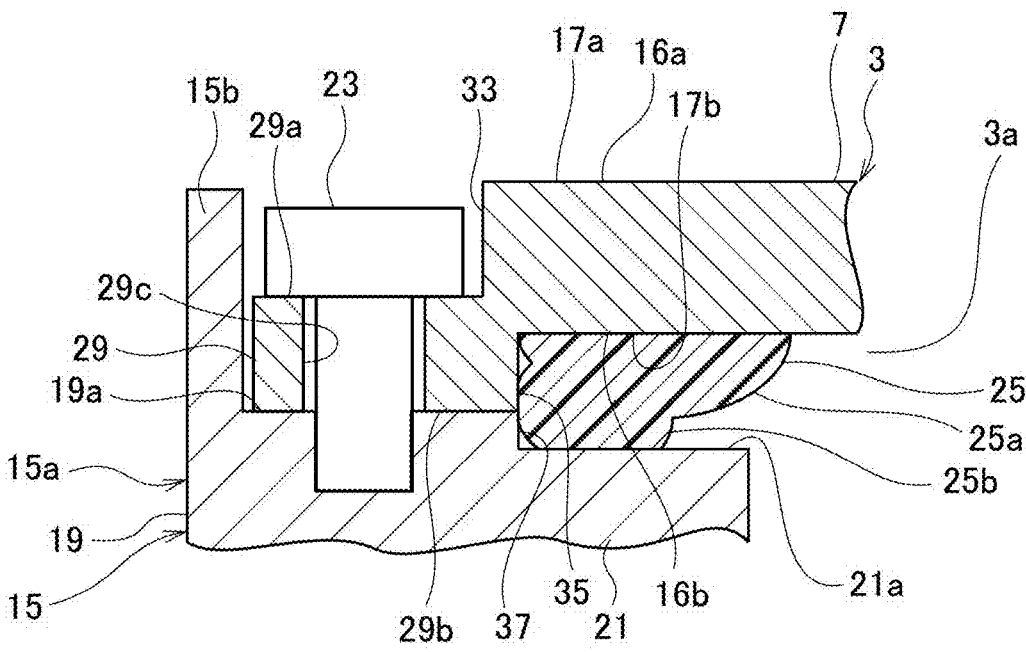
FIG. 12 is a schematic sectional view illustrating part of a recording device corresponding to the line III-III of FIG. 1 according to an embodiment 3 of the present invention.

FIG. 12 is a schematic sectional view illustrating part of a recording device corresponding to the line III-III of FIG. 1 according to the embodiment 3 of the present invention. In addition, a basic configuration is similar to of the above embodiment and the same or corresponding components are represented with the same reference numerals to eliminate duplicate explanation. FIG. 12 is the sectional view corresponding to FIG. 3.

As illustrated in FIG. 12, the present embodiment makes the configuration of the cover 17 identical with of the embodiment 1. On the other hand, a receiving face 21a of a base 15 is configured to be adjacent to a connected face 19a of the base 15 in a stepped shape.

In particular, the receiving face 21 of the base 15 is recessed to be located farther than the connected face 19*a* relative to the connecting face 29*b* of the cover 17 in a thickness direction.

A step face 37 spanning between the connected face 19*a* and the receiving face 21*a* of the base 15 is continuous to the inner face 35 of the step d2 of the cover 17 on the same plane in the thickness direction. The step face 37 of the base 15 is configured to enlarge the inner face 35 of the step d2 in cover 17 in the thickness direction.

The gasket 25 has two layers similar to the modified example of the embodiment 1 and is adapted to enlargement of a distance between the receiving faces 17*b* and 21*a*. According to cooperation with the step face 37, it is adjusted to the multi-layered gasket 25 even if a step dimension of the inner face 35 of the step is insufficient.

Namely, even if the steps d1 and d2 are set in the same size in this embodiment, compression height of the gasket 25 is altered without being constrained by the steps d1 and d2. In addition, it provides the same effects as the embodiments 1 and 2.

Figure 13:
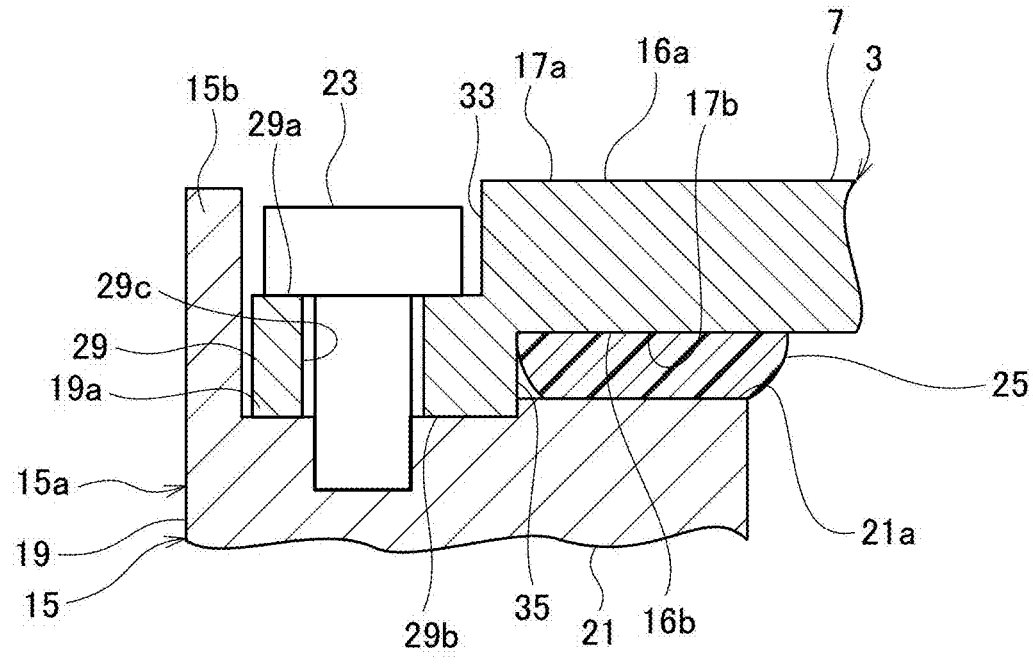
FIG. 13 is a schematic sectional view illustrating part of a recording device corresponding to the line III-III of FIG. 1 according to a modified example of the embodiment 3.
Figure 14:
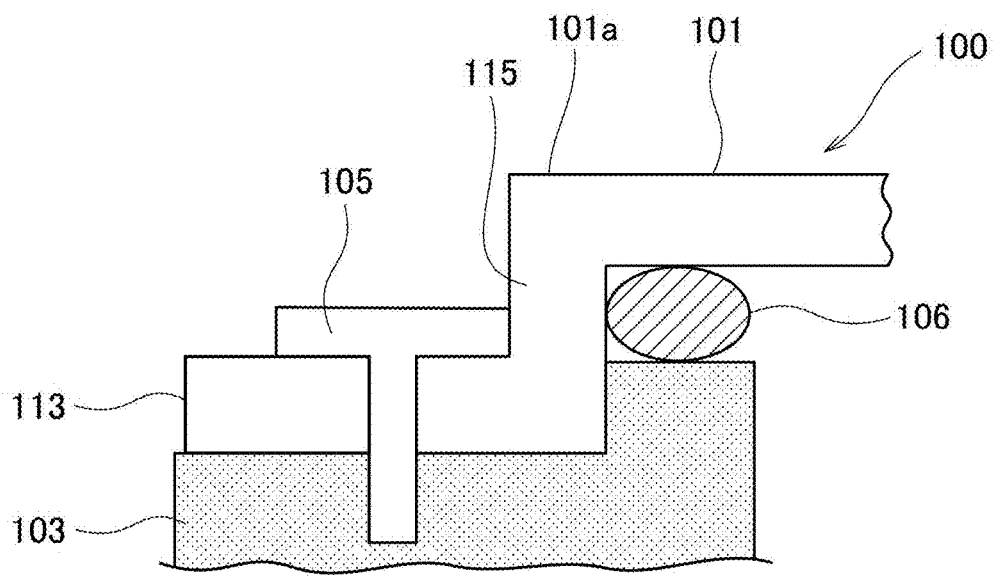
FIG. 14 is a schematic sectional view illustrating part of a recording device corresponding to the line III-III of FIG. 1 according to a conventional example.

FIG. 13 is a schematic sectional view illustrating part of a recording device corresponding to the line III-III of FIG. 1 according to a modified example of the embodiment 3. In addition, a basic configuration is similar to the above embodiment and the same or corresponding components are represented with the same reference numerals to eliminate duplicate explanation.

In the present modified example, a receiving face 21*a* of a base 15 is formed so as to be projected from the connected face 19*a* toward the receiving face 17*b* of the cover 17.

In addition, the gasket 25 has a single layer similar to the embodiment 1.

According to the present modified example, the inner face 35 of the step of the cover 17 is configured to fit to the step face 37 of the base 15, to easily position the cover 17 to the base 15.

In addition, the present modified example provides the same effects as the embodiment 3.

The invention claimed is:

1. A cover using a plate material comprising:
   an outer peripheral portion having a top face and a bottom face, to interpose a gasket between the bottom face and a base and to be fastened to the base by a fastener from the top face; and
   a connection portion provided on the outer peripheral portion for conducting the fastening, wherein
   the connection portion is provided with a fastening face that is fastened by the fastener on the top face and a connecting face that is connected to the base on the bottom face, and the connection portion is formed into a stepped shape with steps that form a recessed shape on the top face and a projected shape on the bottom face relative to the outer peripheral portion,
   the steps are set to have dimensions less than a thickness of the plate material,
   the stepped shape is provided with an outer face of the steps and an inner face of the steps, the outer face spanning between the fastening face and the top face of the outer peripheral portion and the inner face spanning between the connecting face and the bottom face of the outer peripheral portion, and
   the outer face and the inner face do not overlap each other in a planer direction of the connecting face.

2. The cover according to claim 1, wherein
   the outer face and the inner face are set to intersect the planer direction of the connecting face and are located with respect to each other within a range less than the thickness of the plate material in the planar direction of the connecting face.

3. The cover according to claim 1, wherein
   the outer face and the inner face are located in a same plane so as to intersect with the planer direction of the connecting face.

4. The cover according to claim 1, wherein
   the outer face and the inner face are located in a same plane so as to be orthogonal to the planer direction of the connecting face.

5. The cover according to claim 1, further comprising:
   the gasket adjacent to the connection portion.

6. A recording device accommodating a recording medium in a housing in which the cover according to claim 1 is attached to a base, comprising:
   a receiving face of the cover provided on the outer peripheral portion of the cover to receive the gasket on the bottom face;
   a receiving face of the base provided on an outer peripheral portion of the base to receive the gasket; and
   a connected face of the base provided on the outer peripheral portion of the base to be connected to the connecting face of the cover, wherein
   the receiving face of the base is flatly adjacent to the connected face of the base.

7. A recording device accommodating a recording medium in a housing in which the cover according to claim 1 is attached to a base, comprising:
   a receiving face of the cover provided on the outer peripheral portion of the cover to receive the gasket on the bottom face;
   a receiving face of the base provided on an outer peripheral portion of the base to receive the gasket; and
   a connected face of the base provided on the outer peripheral portion of the base to be connected to the connecting face of the cover, wherein
   the receiving face of the base is adjacent to the connected face of the base in a stepped shape.

8. The recording device according to claim 7, wherein
   the receiving face of the base is located farther than the connected face of the base with respect to the connecting face of the cover.

9. A method for manufacturing the cover according to claim 1, comprising:
   a first step of forming a semi-finished cover product being a plate shape having the outer peripheral portion; and
   a second step of forming the connection portion having the stepped shape on the outer peripheral portion of the semi-finished cover product being the plate shape using half-blanking process of pressing.

\* \* \* \* \*